United States Patent [19]

Volk et al.

[11] 4,354,696

[45] Oct. 19, 1982

[54] DEVICE FOR PASSIVE ACTUATION OF A SAFETY BELT

[75] Inventors: Hans-Joachim Volk, Ebersdorf; Michael Forkel, Coburg, both of Fed. Rep. of Germany

[73] Assignee: Metallwerk Max Brose GmbH & Co., Coburg, Fed. Rep. of Germany

[21] Appl. No.: 190,729

[22] Filed: Sep. 25, 1980

[30] Foreign Application Priority Data

Oct. 18, 1979 [DE] Fed. Rep. of Germany ....... 2942207

[51] Int. Cl.³ ............................................. B60R 21/10
[52] U.S. Cl. ................................................. 280/804
[58] Field of Search ...................... 280/804, 802, 803; 297/469

[56] References Cited

U.S. PATENT DOCUMENTS 4,220,355 9/1980 Henderson ........................... 280/804
4,241,939 12/1980 Suzuki ................................. 280/804
4,256,331 3/1981 Schwanz ............................. 280/804

*Primary Examiner*—Robert R. Song
*Attorney, Agent, or Firm*—Toren, McGeady & Stanger

[57] ABSTRACT

A device for passive actuation of a safety belt includes an elongated force transmission member with an engaging member secured to the transmission member so that a certain amount of play is present in the elongated direction between the transmission member and the engaging member. A locking device is arranged to receive and secure the engaging member in the locked position. A release member is secured to the force transmission member so that it moves with the transmission member while the transmission member moves relative to the engaging member whereby the release member can contact and displace the locking device out of locking contact with the engaging member. With the engaging member released from the locked position when the certain amount of play is traversed by the force transmission member, the transmission member carries the engaging member along with it.

11 Claims, 7 Drawing Figures

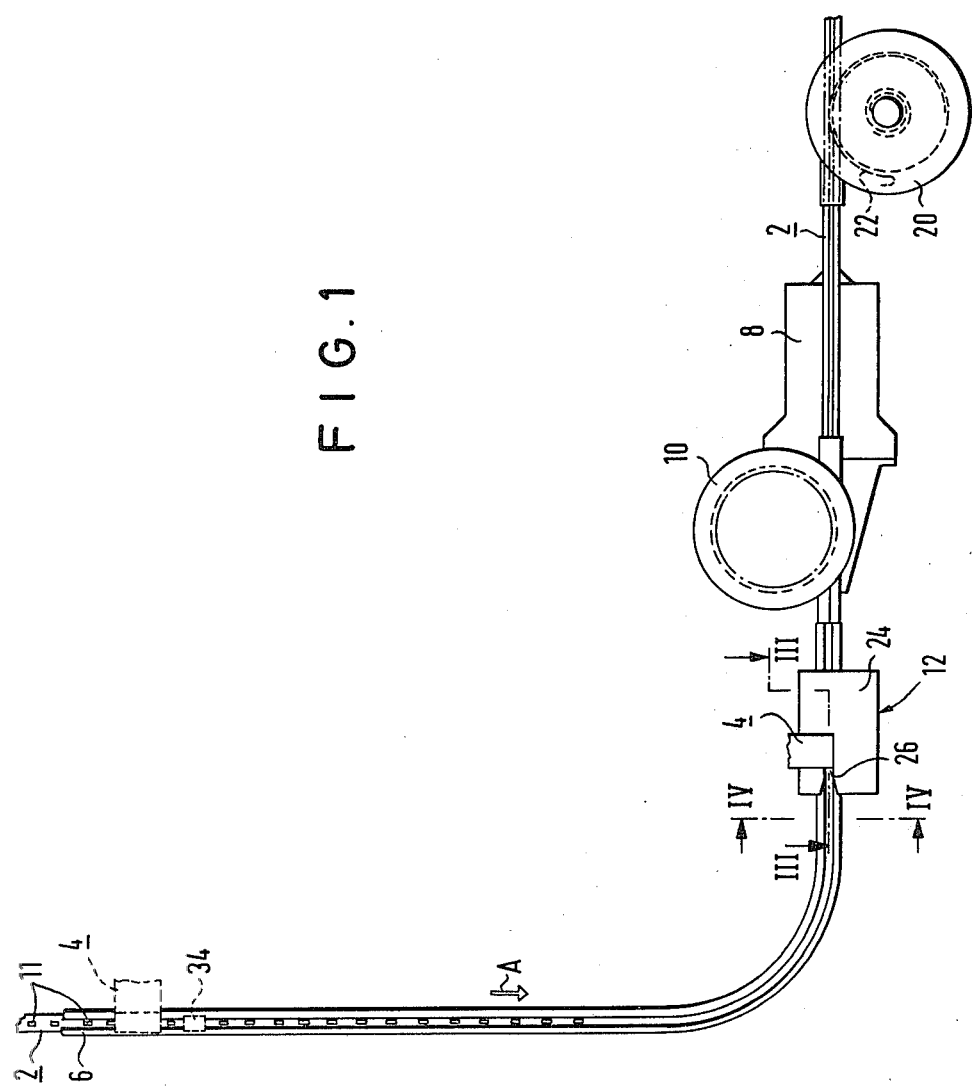

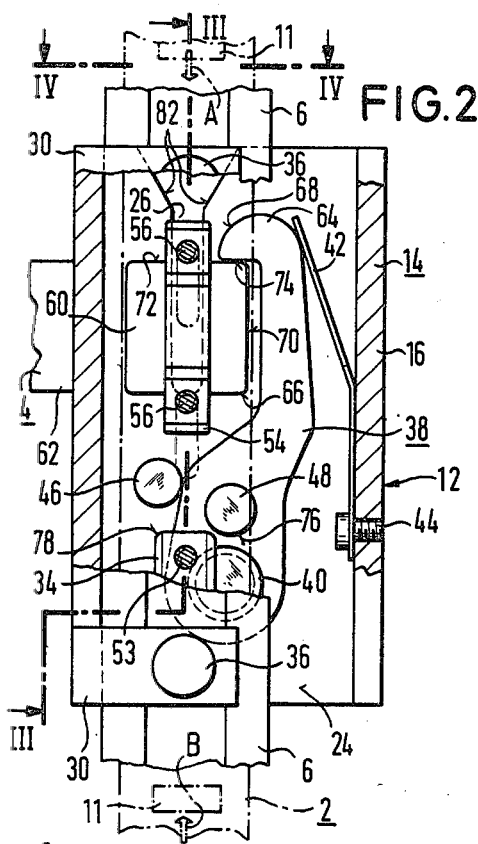
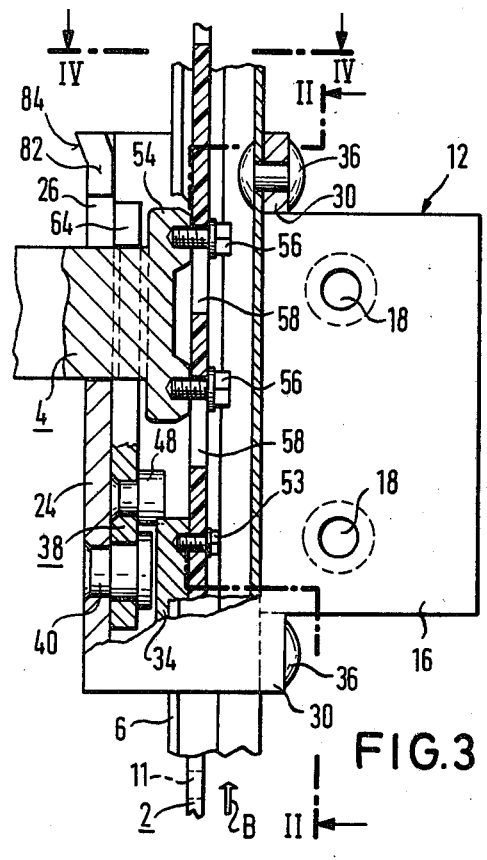
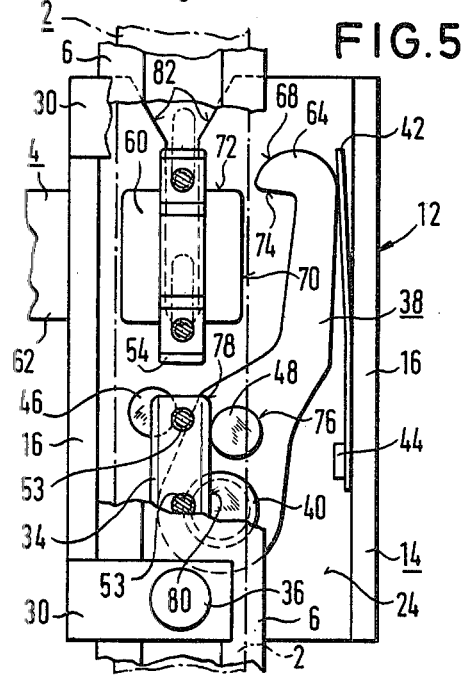
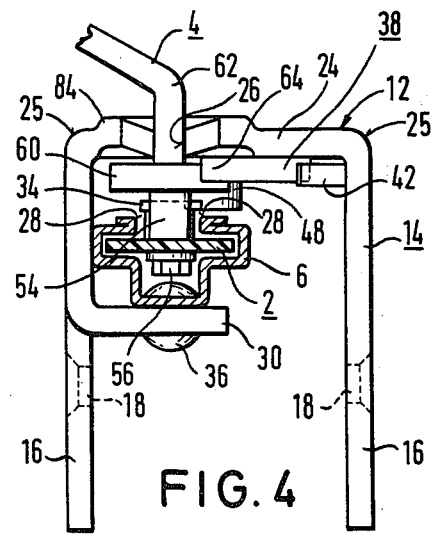

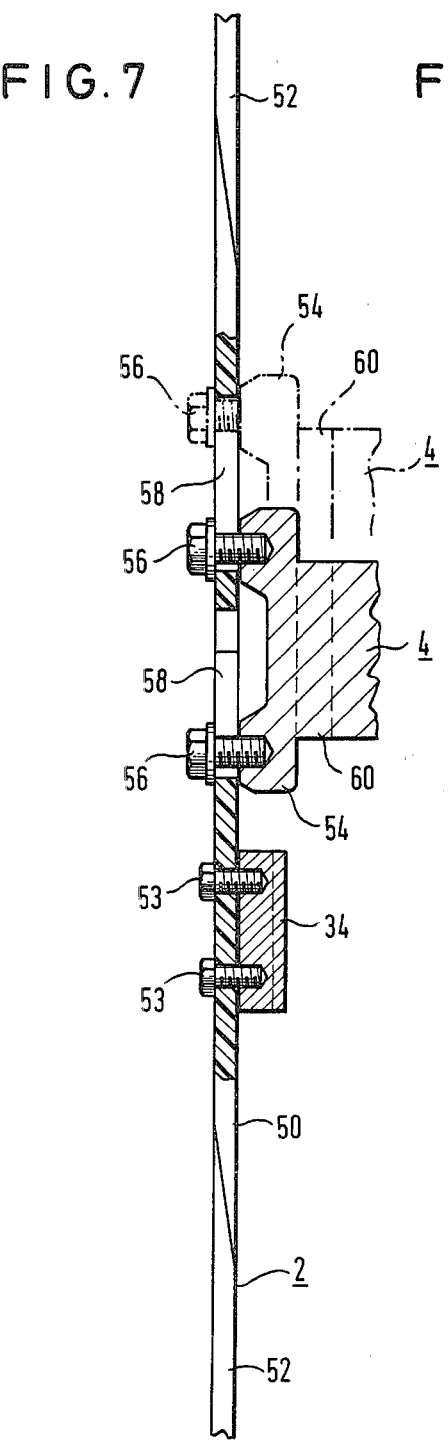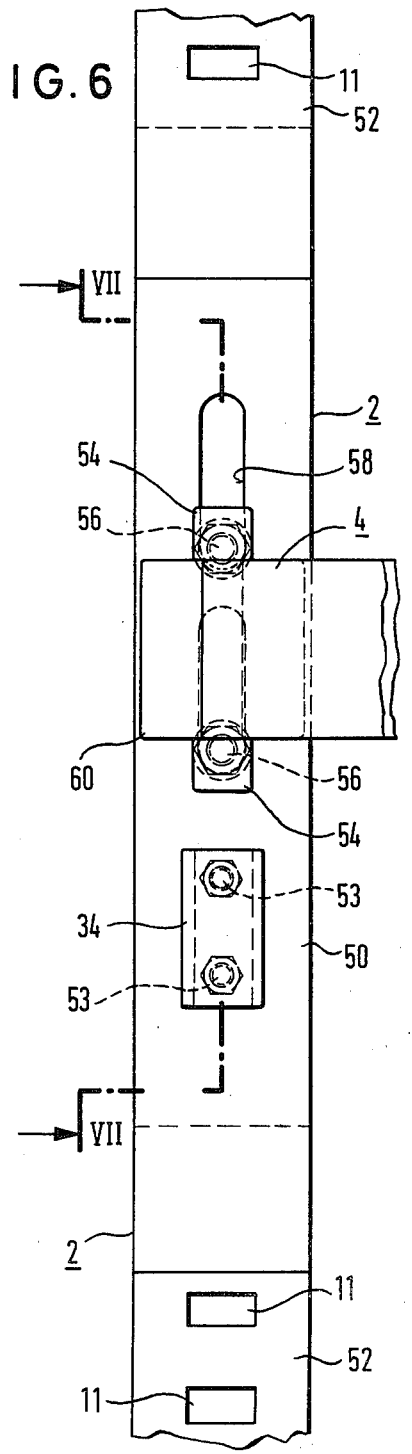

DEVICE FOR PASSIVE ACTUATION OF A SAFETY BELT

CROSS-REFERENCES TO RELATED APPLICATIONS

The present invention relates to the subject matter disclosed in U.S. Application Ser. No. 138,119 filed Apr. 7, 1980.

SUMMARY OF THE INVENTION

The present invention is directed to a device for passive actuation of a safety belt, and, more particularly, to a device for releasably locking an engaging member attached to an elongated force transmission member.

U.S. Patent Application Ser. No. 138,119 discloses a device for passive actuation of a safety belt and includes an elongated force transmission member which is unyielding to tension or compression. An engaging member for a safety belt is secured to the force transmission member.

The present invention concerns the arrangement of a locking device into which the engaging member can be inserted for fixing the safety belt secured to the engaging member. In U.S. Patent Application Ser. No. 138,119 reference is made to German Offenlegungsschrift No. 21 56 926 in which a similar device is disclosed.

It is the primary object of the present invention to provide a device for passive actuation of a safety belt which guarantees a reliable releasable locking arrangement while affording a simple structure.

In accordance with the present invention, the engaging member is secured to the force transmission member with a certain amount of play between the two in the longitudinal direction of the transmission member. A release member is fixed to the force transmission member adjacent the engaging member for releasing the locking device so that the engaging member can be released from its locked position.

With this arrangement the locking device can be released in a simple and reliable manner which improves the functional safety of the actuating device for the safety belt. In operation, the locking device can be released by an appropriate movement of the force transmission member regardless of the position of the locked engaging member.

In providing the complete release of the locking device, the release member is movable in engagement with the locking device for displacing it so that the engaging member is released. In this way it is assured that the engaging member is completely released when the force transmission member moves the engaging member after sufficient movement is effected to take up the play.

In the operation of the actuating device for a safety belt an especially simple construction is attained when the force transmission member can be moved in the insertion direction until the engaging member is secured in the locked position by the locking device. Further, when the force transmission member is moved in the removal direction, opposite to the insertion direction, initially the transmission member moves the release member, however, due to the play between the engaging member and the transmission member, the engaging member does not move. This arrangement has the advantage that for loosening and removing the safety belt from around a person, it is only necessary for the force transmission member to perform one uninterrupted movement in the removal direction.

Another feature of the invention is the incorporation of a stop lever in the locking device which bears against a retention surface on the engaging member when the engaging member is inserted in the locking device into the locked position. The contacting surface of the stop lever and the retention surface on the engaging member extend perpendicularly to the removal direction. The tension forces acting on the engaging member via the safety belt and the main components of the safety belt which extend approximately in the removal direction, can be transmitted through the stop lever directly to the locking device and then to the vehicle body. Accordingly, it is assured that the engaging member, even when under great tension force such as in an accident, remains in the locked position.

Release of the engaging member from the locked position is effected in a simple manner by providing the stop lever with a control surface contacted by the release member so that the stop lever is disengaged from the retention surface of the engaging member by the movement of the release member.

An especially simple construction of the locking device is afforded by arranging the stop lever as a pivotal member biased into the locking position by a spring element.

Since it is necessary to displace the stop lever from its locking position for inserting the engaging member into the locking device, such displacement can be afforded by providing a guide surface on the stop lever inclined to the insertion direction so that the guide surface is contacted by a countersurface on the engaging member as it is inserted into the locking device, with the stop lever being pivoted out of the locking position by the engaging member. The pivotal displacement of the stop lever is maintained until the engaging member reaches its final or locked position in the locking device.

Another feature of the invention is the arrangement of the control surface on the stop lever so that it is not contacted by the release member as the release member and engaging member are moved into the locking device. As a result, the movement of the release element into the locking device is unobstructed. Such an arrangement is also employed when, for the sake of simplicity, the control surface is formed as a cam on the stop lever.

In a preferred embodiment of the present invention, the stop lever is elongated and extends in a direction generally parallel to the insertion or removal direction. The leading end of the stop lever in the insertion direction is pivotally mounted and the guide surface is located at its trailing end. The control surface is located between the leading and trailing ends. Further, the release member is positioned ahead of the engaging member in the insertion direction into the locking device.

A locking device which is strong and insensitive to dirt is provided by positioning the locking device within a casing in which the stop lever is located and through which the force transmission member extends. The casing includes a groove extending parallel to the insertion or removal direction and open in the removal direction. As the engaging member moves into the locking device it passes through the groove. Further, a base portion of the engaging member including the retention surface and, if necessary, the countersurface, is located within the casing when the engaging member is moved into the locked position.

The insertion of the engaging member into the locking device is facilitated by inlet bevels located at the entrance into the groove in the casing.

Preferably, the force transmission member is in the form of a band with spaced holes through it and is a continuous member in the region of the engaging member and the release member. Accordingly, the band remains sufficiently strong in the region of the engaging member and the release member when it is provided with fastening holes for these members.

The play in the elongated direction of the force transmission member between the engaging member and the force transmission member is achieved in a simple manner by mounting the engaging member on the force transmission member by means of clamping bolts or fastening screws passing through oblong holes or slots extending in the elongated direction of the force transmission member. The length of the oblong slots corresponds to the play between the engaging member and the force transmission member.

In a preferred embodiment, the force transmission member is constructed, in the region in which the engaging member and the release member are mounted, as an essentially continuous intermediate portion formed of a polyester resin with one or both of the opposite ends of the intermediate portion being adhered or welded to a band with holes formed of a polyester resin and providing the remainder of the force transmission member. Alternatively, a continuous band containing holes and formed of a polyester resin can be used as the force transmission member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a schematic side view of a device for passive actuation of a safety belt embodying the present invention;

FIG. 2 is a view partly in section of the bottom of a locking device taken along the line II—II in FIG. 3 with the locking device in the locked position;

FIG. 3 is a side view, partly in section, of the locking device illustrated in FIG. 2 and taken along the line III—III in FIG. 2;

FIG. 4 is a view of the locking device displayed in FIGS. 2 and 3 taken along the line IV—IV:

FIG. 5 is a view similar to FIG. 2 showing the locking device in the released position;

FIG. 6 is a front view of the force transmission member along with the engaging member and the release member; and FIG. 7 is a side view, partly in section, taken along the line VII—VII in FIG. 6.

DETAIL DESCRIPTION OF THE INVENTION

In FIG. 1 there is a schematic showing of a device for passive actuation of a safety belt for a motor vehicle. The device includes an elongated force transmission member 2 which is unyielding in tension and comparession, with an engaging member 4 secured to the force transmission member. The engaging member 4 is part of a safety belt. Force transmission member 2 is guided in a guide section 6 and travels over a toothed roller 10 driven by motor 8. The teeth on the roller 10 engage within rectangular openings 11 in the force transmission member 2, note FIG. 6. The force transmission member 2 conducted past the drive roller 10, is wound on a drum 20. Within the drum 20, a spiral spring 22 exercises an initial stressing force in the winding direction of the drum. When the engaging member is located in any position, for instance when it is located in the locked position within locking device 12, the force transmission member, between the engaging member 4 and the drum 20, is maintained under tensile stress which prevents rattling of the force transmission member within the guide section 6. In FIG. 1 the engaging member 4 within the locking device 12 is shown in full lines, while the engaging member 4 along with a release member 34 is shown in dashed lines spaced along the guide section 6 from the locking device 12.

In another embodiment, not shown, the force transmission member is wound on the drum by a motor. Details of such an arrangement are to be found in the German Offenlegungsschrift No. 21 56 926. Further, in the German patent publication there is provided a showing of the installation of the device for passive actuation of a safety belt inside the door of a vehicle.

As mentioned above, an intermediate position of the engaging member 4, spaced from the locking device 12, is shown in dash lines. During the automatic placement of a safety belt, not shown, around a person sitting in a motor vehicle seat, the engaging member 4 connected to the belt is moved by the motor-driven force transmission member 2 into the position shown in full lines, that is the locked position. In this position, the engaging member is located inside the locking device 12 which securely holds the engaging member in this position. Any forces transferred during an accident from the safety belt to the engaging member 4, are transferred via the locking device directly to the motor vehicle body. Since these forces are not absorbed by drive roller 10 or the drum 20 these components can be of a simple construction and are not required to be of a high mechanical strength. When the safety belt is to be removed, it is automatically released when the motor-driven force transmission member initially releases the locking device and then moves the engaging member out of the locking device. The following is a detailed explanation of the construction of the locking device 12 and of its interaction with the force transmission member 2.

As shown in FIGS. 2-5, locking device 12 includes a casing 14 formed of sheet metal and bent into an approximately U-shape. The casing 14 has side walls 16 containing fastening holes 18 for securing the casing at a central spar or cross-beam of the vehicle, not shown. Note FIGS. 3 and 4. The bight portion of the casing is formed by an end wall 24 extending between the side walls 16. A groove 26 is formed in the end wall 24 and is opened at one end, note FIG. 3. The groove 26 extends parallel to the bent edges 25 connecting the side walls 16 to the end wall 24. Groove 26 receives the engaging member 4 as it is moved into the locking device 12, note also FIG. 1.

Guide section 6 passes through the casing 14 extending in the same direction as the elongated direction of the edges 25. As displayed in cross-section in FIG. 4, the guide section 6 is stamped out of sheet metal and shaped so that it encloses the two longitudinal edges of the band-shaped force transmission member 2. Instead of a stamped section of sheet metal, the guide section 6 can be formed as an extruded section of aluminum or plastic. Flanged edges 28 on the guide section 6 are spaced apart forming an elongated opening through which the engaging member 4 and release member 34, mounted on the force transmission member 2, extend into the guide section 6, note also FIGS. 6 and 7.

Guide section 6 is riveted to the casing 14. For such an attachment, two sheet metal lugs 30 are bent inwardly from one of the side walls 16 extending perpendicularly to the side walls, with the connection between the guide section and the casing being provided by double rivet heads 36.

The construction of the locking device 12 is very simple. A spring biased stop lever 38 is pivotally mounted on the inside of end wall 24 of the casing. A graduated bolt 40, note FIG. 3, is riveted to the end wall and serves as a pivot shaft for the stop lever. The biasing action on the stop lever is achieved by a flat spring 42 secured by a screw 44 to one of the side walls 16. One end of the flat spring 42 is secured by a screw 44 to one of the casing walls while the opposite end of the spring is in contact with the free end of the stop lever 38, that is the upper end as viewed in FIGS. 2 and 5. A short bolt-shaped stop 46 is firmly riveted to the inside surface of the end wall 24. Stop lever 38 is biased by the flat spring 42 against stop 46 as long as the stop lever is not pivoted out of this biased position by the engaging member 4 or by the release member 34. The release member 34 pivots the stop lever 38 when it contacts a cam 48 riveted to the stop lever, this arrangement will be discussed later in connection with FIG. 5.

In FIGS. 6 and 7 it can be seen that in the region of the engaging member 4 and the release member 34, the transmission member 2 consists of an elongated intermediate portion 50 connected to the bands 52 containing the holes 11. The ends of the portion 50 are adhered to the ends of the bands 52. To enlarge the adhesion surfaces, as shown in FIG. 7, the corresponding ends of the intermediate portion 50 and the bands 52 are bevelled. The intermediate portion 50 and the bands 52 are formed of a polyester resin which has especially favorable material characteristics.

Release member 34 is fixed to the intermediate portion 50 by a pair of screws 53 spaced apart in the elongated direction of the force transmission member 2. While engaging member 4 is secured to the intermediate portion 50 a certain amount of clearance or play is provided between the two in the longitudinal direction of the force transmission member. To provide such play, an approximately bridge-shaped fastening base 54 of the engaging member 4 is attached by screws or rivets 56 to the intermediate portion 50. Each of the screws or rivets 56 is movable in the longitudinal direction of the force transmission member through oblong holes 58. As can be seen in FIG. 6, the two oblong holes 58 are aligned in spaced relation in the longitudinal direction of the force transmission member. The oblong holes 58 extend approximately along the center of the intermediate portion 50. The two end positions of the engaging member 4 relative to the force transmission member 2 are shown in FIG. 7, one in solid lines and the other in dot-dash outline. In other words, because of the position of the screws or rivets 56 in the oblong holes 58, it is possible for the force transmission member 2 to effect a certain amount of movement, corresponding to the play provided by the oblong holes, relative to the engaging member 4.

In the sectional view shown in FIG. 2, the engaging member 4 and the release member 34 are viewed from below with the screws 53, 56 shown in section. As shown in FIG. 4, an enlarged retention member 60 is secured to the engaging member 4 at the end of the narrow fastening base 54 spaced outwardly from the guide section 6, note FIG. 4. As can be seen in FIGS. 2 and 5, the retention area 60 is approximately square. Bracket portion 62 extends from the retention area or member 60 through the groove 26 and then it is bent, as shown in FIG. 4, to the left. Bracket portion 62 is connected to the safety belt to be actuated.

To place and fix the safety belt, force transmission member 2 is moved by the motor-driven roller 10 in the direction of the arrow A shown in FIGS. 1 and 2. In the locked position, the release member 34 and the engaging member 4 are located in the casing 14 of the locking device 12. The release member 34 precedes the engaging member 4 into the locking device. As shown in FIG. 4, the height of the release member is limited so that as it moves into the casing 14 it does not contact the hook-shaped free end 64 of the stop lever 38. As the release member 34 moves into the casing 14 and before it strikes the cam 48 on the stop lever, the stop lever is pivoted by the engaging member 4 from its spring biased position shown in FIG. 2 into an outward position permitting the release member to move past the cam 48. Displacement of the stop lever 38 is effected as a rounded-off edge 66 of the retention member 60, that is at the leading end of the retention member viewed in the insertion direction A, contacts a similarly rounded-off surface 68 on the stop lever 38. The surface 68 is curvilinear and extends generally transversely of the insertion direction A. As the engaging member 4 preceded by the release member 34 continues to move into the casing 14 of the locking device 12, the stop lever is pivoted outwardly as it slides along side surface 70 of the retention member 60 which side surface extends parallel to the insertion direction A. When the bracket portion 62 of the engaging member 4 strikes against the end of the groove 26 in the casing 14, the release member has moved past the cam 48 and the hook-shaped free end 64 of the stop lever 38 has reached the end of the side surface 70, that is the upper end as viewed in FIGS. 2 and 5, the stop member 38, under the biasing action of the spring 42, swings inwardly and secures the engaging member in the locked position shown in FIGS. 2 to 4. In the locked position, the hook-shaped free end 64 of the stop lever bears against an end surface 72 of the retention member 60, that is, the trailing surface of the retention member as viewed in the insertion direction A. This end surface 72 extends perpendicularly to the insertion direction A. The hook-shaped free end 64 has a surface 74 which contacts the end surface 72 and this surface 74 is approximately perpendicular to the insertion direction A. This resulting contact point between the stop lever 38 and the engaging member 4 lies approximately on a line which is parallel to the insertion direction A and extends through the pivot axis of the stop lever. With this arrangement, the stop lever is retained in the locked position even when very high tension forces act on the engaging member 4 in the direction B opposite to direction A.

To release the safety belt, force transmission member 2 is moved in direction B, note the arrow at the lower end of FIGS. 2 and 3, which is opposite to the insertion direction A. When the engaging member is locked it is possible for the force transmission member 2 to be moved in the direction B for a distance corresponding to the length of one of the oblong holes 58. During this movement, the force transmission member 2 moves relative to the engaging member 4 and during such relative movement it carries the release member along with it. As the release member 34 moves while the engaging member 4 is stationary, initially the rounded-off edge 78 of the release member contacts the peripheral surface 76 of the cam 48. The rounded-off edge 78 of the release member 34 is at the leading end of the release member in the release direction B. With the release member 34 in contact with the cam 48, as the release member continues to move in the direction B, that is in the upward direction as viewed in FIG. 2, the stop lever 38 is pivoted in the clockwise direction and remains in this position (release position) as long as the cam 48 continues in sliding contact with the side surface 80 of the release member. In this release position of the stop lever 38, the hook-shaped free end 64 of the stop lever has swung outwardly out of contact with the end surface 72 on the retention member 60. When, as shown in FIG. 5, the force transmission member 2 has moved relative to the engaging member 4 for the extent of the play between these two members, that is for the length of one of the oblong slots 58, the engaging member is moved along with the force transmission member since the screws 56 contact the trailing ends of the oblong slots 58 in the release direction B. The engaging member 4 is released and continues to move in the direction B out of the casing 14 of the locking device. As soon as the cam 48 on the stop lever 38 reaches the trailing end of the release member 34 in the release direction B the retention member 60 of the engaging member 4 has moved outside the pivot range of the stop member 38, and under the biasing action of spring 42 the stop lever swings back into its biased position.

As explained above, during the closing of the safety belt, the stop lever is first pivoted out of its inactive spring biased position by the engaging member 4 so that it can subsequently lock the engaging member 4 in its locked position when the bracket portion 62 of the engaging member contacts the end of the groove 26. When the safety belt is to be released, the stop lever is again pivoted, however, this time by the release member 34 releasing the engaging member 4 from its locked position. In another embodiment, not shown, if minor changes in the dimensions of the engaging member 4 and the release member 34 are present, it is possible to permit the stop lever 38 to be pivoted outwardly by the release element while the safety belt is being closed. It is decisive in both embodiments that the release member 34 can move independently of the locked engaging member 4 while the safety belt is being opened for releasing the locking device 12. However, if the release member 34 and the engaging member 4 are connected so there is no relative movement between them, then even a small tension force acting on the engaging member 4 would impede the pivot movement of the stop lever 38 and possibly prevent the releasing action from being effective.

To assure that the engaging member 4 can pass through the groove 26 without any difficulty, bevel portions 82 are provided at the entrance to the groove so that the entrance has a funnel-like shape, note FIGS. 2 and 5. In addition, the end wall 24 of the casing 14 is provided in the region of the entrance to the groove 26 with a slight outwardly directed curvature 84, note FIGS. 3 and 4, which facilitates the passage of the wide retention member 60 of the engaging member 4.

While specific embodiments of the invention have been shown and described in detail to illustrate the application of the inventive principles, it will be understood that the invention may be embodied otherwise without departing from such principles.

What is claimed is:

1. Device for passive actuation of a safety belt, comprising an elongated force transmission member unyielding in tension and compression, an engaging member attached to said force transmission member and arranged to be connected to a safety belt, a locking device for removably receiving said engaging member for securing said engaging member in the locked position, said engaging member being interengageably attached to said force transmission member so that a certain amount of play is present between said engaging member and said force transmission member in the elongated direction of said transmission member whereby said force transmission member can be moved in the elongated direction for the certain amount of play before commencing movement of said engaging member, release means fixed to said force transmission means adjacent to and spaced from said engaging member for movement with said force transmission member relative to said engaging member for releasing said engaging member from the locked position, said release means comprises a release member, in the locked position of said engaging member said release member being movable into contact with said locking device by moving said force transmission member so that said force transmission member and release member move relative to said engaging member with said release member being movable into contact with said locking device so that said locking device is displaced from the locking contact with said engaging member, and when said force transmission member moves a distance greater than the certain amount of play between said engaging member and said force transmission member said engaging member is moved out of said locking member while said release member remains spaced from said engaging member.

2. Device for passive actuation of a safety belt, comprising an elongated force transmission member unyielding in tension and compression, an engaging member attached to said force transmission member and arranged to be connected to a safety belt, a locking device for removably receiving said engaging member for securing said engaging member in the locked position, said engaging member being attached to said force transmission member so that a certain amount of play is present between said engaging member and said force transmission member in the elongated direction of said transmission member whereby said force transmission member can be moved in the elongated direction for the certain amount of play before commencing movement of said engaging member, and release means fixed to said force transmission means adjacent to said engaging member for movement with said force transmission member relative to said engaging member for releasing said engaging member from the locked position, said force transmission member being a band-shaped member having holes therethrough and said band-shaped member being continuous in the region of said engaging member and said release member, said force transmission member in the region of said engaging member and said release member comprising a continuous intermediate portion formed of a polyester resin and said force transmission member further including band-shaped end portions each extending from an opposite end of said intermediate portion and said band-shaped end portions being formed of a polyester resin and having holes therethrough, said intermediate portion having a pair of oblong holes therethrough extending in the elongated direction of said force transmission member with said oblong holes being aligned and spaced apart in the elongated direction of said force transmission member, fastening means extending through said oblong holes and securing said engaging member to said intermediate portion, and each said oblong hole having a length corresponding to the certain amount of play between said engaging member and said force transmission member.

3. Device, as set forth in claim 1 or 2, wherein said locking device comprises a stop lever, said engaging member including a retention member having a retention surface thereon extending perpendicularly to the elongated direction of said force transmission member through said locking device, and said stop lever having a surface extending generally parallel to said retention surface for engaging said retention surface and holding said engaging member in the locked position.

4. Device, as set forth in claim 3, wherein said stop lever includes a control surface thereon, said release member being slidably engageable with said control surface for displacing said stop lever out of engagement with the retention surface on said retention member of said engaging member.

5. Device, as set forth in claim 4, wherein said stop lever being pivotally mounted so that said stop lever pivots away from said engaging member when said release member slidably engages said control surface, and a spring member in engagement with said stop lever for biasing said stop lever into position for locking said engaging member.

6. Device, as set forth in claim 5, wherein said stop lever having a guide surface thereon extending generally obliquely to the elongated direction of said force transmission member through said locking device, said engaging member having a countersurface thereon arranged to contact said guide surface when said engaging member is moved into said locking device for pivoting said stop lever out of the path of said engaging member into said locking device until said engaging member reaches a stop position in said locking device where said stop lever pivots into contact with said retention surface on said retention member of said engaging member.

7. Device, as set forth in claim 6, wherein in the position of said stop lever pivoted outwardly by the contact between said guide surface thereon and said countersurface on said engaging member, said control surface on said stop lever is closely spaced from said release member.

8. Device, as set forth in claim 7, wherein said control surface comprises a cam secured to and extending outwardly from said stop lever.

9. Device, as set forth in claim 7, wherein said stop lever being elongated in the elongated direction of said force transmission member through said locking device and having a first end and a second end, said first end of said stop lever being more remote from said engaging member as said engaging member moves into said locking device, said stop lever being pivotally mounted adjacent said first end thereof, said guide surface on said stop lever being located at the second end thereof, said control surface being located between said first and second ends, and said release member on said force transmission member preceding said engaging member as said engaging member is moved into the locked position within said locking device.

10. Device, as set forth in claim 9, wherein said locking device comprises a casing, said stop lever being pivotally mounted on said casing, said force transmission member extending in the elongated direction thereof through said casing, said casing having a groove open at one end and extending for a portion of the length of said casing in the elongated direction of said force transmission member with said groove being open at the end of said casing into which said engaging member is inserted into the locked position, said engaging member being slidably movable through said groove into the locked position, said retention member on said engaging member being located inwardly of said groove when said engaging member is in the locked position and said countersurface being located on said retention member and being disposed within said casing when said engaging member is in the locked position.

11. Device, as set forth in claim 10, wherein said groove having an entrance end through which said engaging member passes into said casing and said entrance end having the opposite sides thereof in diverging relation to the entrance.

* * * * *